United States Patent Office 3,824,195
Patented July 16, 1974

3,824,195
OXIDATIVE DEHYDROGENATION CATALYST
Emory W. Pitzer, Bartlesville, Okla., assignor to
Phillips Petroleum Company
No Drawing. Filed Nov. 1, 1971, Ser. No. 194,614
Int. Cl. B01j 11/82
U.S. Cl. 252—437       18 Claims

ABSTRACT OF THE DISCLOSURE

An improved oxidative dehydrogenation catalyst comprising a lithium-tin-phosphorus-oxygen composition is disclosed. Also disclosed is a method of reactivating a composition of a similar nature. The improved catalyst and the reactivated catalyst, both, are formed by procedures involving phosphorus deposition.

---

This invention relates to an improved oxidative dehydrogenation catalyst.

In one of its more specific aspects, this invention relates to an improved catalyst, the method of its preparation and to its employment in dehydrogenation of alkenes.

The present invention pertains to the preparation and use of a Group IA or IIA metal/Sn/P/O catalyst in which lithium is the preferred Group IA or Group IIA metal. In its basic embodiment, the catalyst is generally in the form of a shaped Li/Sn/P/O catalyst such as a tablet. In this form it is employed to dehydrogenate alkenes, cycloalkenes, alkylpyridines and alkylaromatics. The alkenes will have about 3 to about 10 carbon atoms per molecule; the cycloalkenes will have from about 4 to about 10 carbon atoms per molecule; the alkylpyridines and alkylaromatics will have from about 1 to 4 alkyl groups per molecule, the alkyl groups containing 1 to about 6 carbon atoms per group with at least 1 alkyl group containing at least 2 carbon atoms. Examples of suitable feedstocks include propylene, octenes, cyclohexene, 3-isopentylcyclopentene, propylbenzene, ethylpyridine, 2,3,4-trimethyl-5-ethylpyridine, and mixtures of the above.

In its basic embodiment, the feedstocks are oxidatively dehydrogenated at temperatures in the range of from about 700 to about 1300° F. at pressures from about 0.05 to about 250 p.s.i.a. The conversion is conducted in the presence of a free oxygen-containing gas, such as air, at oxygen:gaseous organic feed volumetric ratios of from about 0.1 to 1 to about 3 to 1. Steam can be introduced to provide steam to organic feed volumetric ratios of from about 0.1 to 1 to about 50 to 1. The gaseous hourly space rate of the feedstock will be from about 50 to 5000 GHSV.

The process is carried out by forming a mixture comprising feed, steam and the free oxygen-containing gas, passing this mixture into contact with the catalyst under the prescribed conditions to produce a reaction product from which the desired product is separated by conventional methods.

The above process conditions also apply to the employment of the catalyst as produced by the present invention. According to this invention there is provided a method for preparing an improved dehydrogenation catalyst, a method of reactivating a dehydrogenation catalyst, an improved dehydrogenation catalyst and a regenerated catalyst.

The improved catalyst of this invention will have improved selectivity to desired products and increased physical strength.

The catalyst of the present invention is prepared by forming a shaped Sn/P/O composition to produce a catalyst structure containing from about 0.1 to about 14 weight percent phosphorus. This structure is then impregnated with an additional amount of phosphorus, in an amount from about 1 to about 3.5 weight percent such that the total phosphorus content of the Sn/P/O composition does not exceed about 15 weight percent. This composition is dried and calcined and impregnated with lithium in an amount from about 0.1 to about 10 weight percent based on the Sn/P/O composition. The resulting composition is then dried and calcined.

In respect to the regenerated catalyst, a used catalyst, having an impaired catalytic activity, is impregnated with phosphorus and with lithium, consecutively, to restore its activity.

In preparing the improved catalyst, the shaped Sn/P/O composition can be prepared by any method which will produce a shaped mixture of tin oxide and tin phosphate containing from about 0.1 to about 14 weight percent phosphorus. Preferably, this composition will have a surface area of at least about one square meter per gram.

The tin content of the composition will depend upon the amount of phosphorus present but will generally be in the range of from about 15 to about 75 weight percent. The remainder of the composition will comprise oxygen in amounts sufficient to satisfy the valence requirements of the phosphorus and tin.

In a preferred method of preparation, the Sn/P/O composition is prepared by mixing a suitable phosphorus compound, for example, phosphoric acid and a suitable tin compound, for example, stannic chloride, followed by coprecipitation with ammonia, aging, washing, drying, shaping and calcining. Whichever mode of preparation is employed, the composition at this stage will consist essentially of phosphorus, tin and combined oxygen.

This shaped and calcined composition is then impregnated with an additional 1–3.5 weight percent phosphorus. This impregnation can be carried out using any phosphorus-containing solution including those employed to form the coprecipitated Sn/P/O composition.

Following this phosphorus impregnation, the shaped catalyst is dried and calcined in air at about 1000 to about 1500° F. for from about 0.1 to about 24 hours.

The shaped composition, having phosphorus incorporated into it in two operations, is then impregnated with from about 0.1 to about 10 weight percent lithium based on the Sn/P/O composition. Lithium compounds convertible to the oxide on calcinations are used, these including lithium nitrate, lithium acetate and the like.

If other Group IA or IIA metals are employed, suitable compounds including sodium carbonate, potassium nitrate, magnesium formate, calcium acetate, barium propionate and the like, can be used.

Following impregnation with the metal of Group IA or Group IIA, the composition is calcined in air at about 1000 to 1500° F. for from about 0.1 to about 24 hours, the resulting composition comprising the improved catalyst.

As mentioned, one embodiment of the present invention involves the rejuvenation of used Li/Sn/P/O catalyst to restore its selectivity or strength. such catalysts are rejuvenated by subjecting them to consecutive impregnations with a phosphorus-containing compound and with a lithium-containing compound. These impregnations are carried out in a manner comparable to that described above for the preparation of fresh catalysts.

The following examples will serve to demonstrate the best mode for carrying out the method of this invention.

EXAMPLE I

Catalyst A was a commercial tin oxide-tin phosphate composition containing about 10 weight percent phosphorus in the form of ⅛″ tablets. It had been prepared by the coprecipitation of tin chloride and phosphoric acid followed by washing, drying, pelletizing and calcining.

Catalyst B, a catalyst of the invention, was prepared by impregnating Catalyst A, first with phosphoric acid and then with lithium nitrate. A 25 ml. quantity (about 32.5 g.) of catalyst was immersed in a 35 ml. aqueous solution containing 8.1 g. of $H_3PO_4$ (85%) for five minutes. The pellets were then drained of excess liquid, dried and calcined by heating in air at about 1100° F.

These catalyst tablets were then immersed for five minutes in a 35 ml. aqueous solution containing 19.8 g. of $LiNO_3$. The tablets were drained of excess liquid, dried and calcined by heating in air. The finished Li/Sn/P/O catalyst contained about 12 weight percent phosphorus and about 2 weight percent lithium.

Catalyst C, which is not a catalyst of this invention, was prepared from Catalyst A but the impregnations with phosphorus and lithium, employing these materials in the quantities used above, were carried out simultaneously. Its final composition was the same as that of Catalyst B.

Catalyst D, which is not a catalyst of this invention, was prepared by impregnating Catalyst A with lithium by immersing a 25 ml. quantity of Catalyst A in 35 ml. of an aqueous solution containing 19.8 g. of $LiNO_3$ for five minutes. The excess liquid was drained from the pellets and the pellets were dried and then calcined according to that method employed for Catalyst B. The resulting Li/Sn/P/O catalyst contained about 10 weight percent phosphorus and about 2 weight percent lithium.

Catalyst E, which is not the catalyst of this invention, was prepared by impregnating Catalyst A with lithium and, after drying and calcining, was impregnated with phosphorus, dried and calcined. It contained about 12 weight percent phosphorus and about 2 weight percent lithium.

The above catalysts were employed under substantially identical conditions in the oxidative-dehydrogenation of butene-2 to butadiene, these conditions including a butene-2 space velocity of 300 GHSV, a 4 to 1 air to butene-2 ratio, an 18 to 1 steam to butene-2 ratio, a temperature of about 1000° F., and atmospheric pressure. Results were as follows:

TABLE I

| Catalyst: | Yield, percent | Modivity, percent | Catalyst crushing strength, lbs. | |
|---|---|---|---|---|
| | | | Unused | After 6-8 hours use |
| A | | | 5.6 | |
| B | 53.1 | 97.3 | 12.9 | 12.5 |
| C | 53.0 | 96.0 | 8.6 | 5.5 |
| D | 58.2 | 92.7 | ~8 | 4.4 |
| E | 43.6 | 85.1 | 11.7 | 9.1 |

In the above table, the term "modivity" refers to a simplified selectivity based on gas phase products only and also neglecting small amounts of oxygenated hydrocarbons in the gas phase.

The above data indicate that Catalyst B had the highest crushing strength both before and after dehydrogenation. These data also indicate that the order of the impregnation with respect to the lithium and phosphorus and the impregnation therewith sequentially is critical to the method of this invention.

As mentioned, in one embodiment of this invention a used catalyst having impaired catalytic activity is impregnated with phosphorus and with lithium, consecutively, to restore the activity of the catalyst. This is exemplified by the following example:

EXAMPLE II

Catalyst F was a commercially prepared Li/Sn/P/O catalyst having impaired activity. It had been employed in the oxidative dehydrogenation of butenes to produce butadiene. It contained about 10 weight percent phosphorus and about 2 weight percent lithium.

Catalyst G was a catalyst rejuvenated according to the method of this invention. It was prepared by impregnating 25 g. of Catalyst F with 2.0 g. $H_3PO_4$ (85%) diluted to 11 ml. The impregnated tablets were dried and calcined in air at 1200° F. for 3 hours. In this manner, the phosphate content of Catalyst G was made to exceed that of Catalyst F by about 2 weight percent.

Catalyst M was a catalyst rejuvenated according to the method of the invention by successive impregnations with $H_3PO_4$ and lithium nitrate. About 25 g. of Catalyst F were impregnated with 11 ml. aqueous solution containing 2.0 g. of $H_3PO_4$ (85%). The tablets were dried and calcined and then impregnated with an 11 ml. aqueous solution containing 1.25 g. of $LiNO_3$. The tablets were again dried and calcined. The rejuvenated catalyst was thusly impregnated with about 2 weight percent phosphorus and about 0.5 weight percent lithium.

Catalysts F, G and M were employed in the oxidative dehydrogenation of butene-2 to butadiene under the conditions of the previous runs. Results were as follows:

TABLE II

| Catalyst: | Yield, percent | Modivity, percent | Catalyst crushing strength, lbs. | |
|---|---|---|---|---|
| | | | Initial | After |
| F | 76 | 95 | 2.6 | 2.8 |
| G | 62 | 91 | 8.3 | 7.1 |
| M | 60 | 97 | 6.7 | 4.9 |

These data indicate that Catalysts G and M, regenerated in accordance with the method of this invention, have improved physical strength.

It will be evident from the foregoing that various modifications can be made to this invention. Such, however, are considered as being within the scope of the invention.

What is claimed is:

1. A method of preparing a dehydrogenation catalyst which comprises:
    (a) impregnating a calcined composition consisting essentially of tin, phosphorous and oxygen, said composition containing from about 0.1 to about 14 weight percent phosphorus, with a calcinable phosphorus-containing compound to increase the phosphorus content to a maximum of about 15 weight percent;
    (b) calcining the composition produced in step (a);
    (c) incorporating into the calcined composition of step (b) a calcinable compound of a metal selected from Group IA or IIA of the Periodic Table; and,
    (d) calcining the composition formed in step (c) to produce said catalyst.

2. A method of reactivating a calcined catalyst consisting essentially of a metal selected from Group IA or Group IIA of the Periodic Table, tin, phosphorus and oxygen, said catalyst having been at least partially deactivated in oxidative dehydrogenation of hydrocarbons which comprises:
    (a) impregnating said catalyst with a calcinable, phosphorus-containing compound to increase the phosphorus content of said catalyst to a maximum of about 15 weight percent; and,
    (b) calcining the composition produced in step (a).

3. The method of claim 1 in which the composition of step (a) is prepared by coprecipitation of a phosphorus-containing compound and a tin-containing compound and calcining the coprecipitate.

4. The method of claim 3 in which the phosphorus is impregnated into said composition in step (b) by impregnation of said composition from a phosphorus-containing solution.

5. The method of claim 1 in which said metal is lithium and is impregnated into said composition with a lithium-containing solution.

6. The method of claim 1 in which a composition consisting essentially of tin, phosphorus and oxygen is prepared by coprecipitation of a phosphorus-containing compound and a tin-containing compound, said composition is calcined, and phosphorus is impregnated into the calcined composition from a phosphorus-containing solution.

7. The method of claim 2 in which the calcined composition produced in step (b) is impregnated with lithium and the lithium-impregnated composition is calcined.

8. A catalyst prepared in accordance with the method of claim 1.

9. A catalyst reactivated in accordance with the method of claim 2.

10. A method of preparing a catalyst which comprises:
   (a) impregnating a calcinable phosphorus-containing substance into a first calcined composition consisting essentially of tin, phosphorus and oxygen, said composition containing from about 0.1 to about 14 weight percent phosphorus and from about 15 to 75 weight percent tin, to form a second composition containing not more than 15 weight percent phosphorus based upon the total of the tin, phosphorus and oxygen of said second composition;
   (b) calcining said second composition;
   (c) impregnating the calcined second composition with a calcinable compound of a metal of Group IA or IIA of the Periodic Table to form a third compound; and,
   (d) calcining said third compound to form said catalyst.

11. The method of claim 10 wherein said calcinable phosphorus-containing acid and said metal of Group IA or IIA is lithium.

12. The method of claim 10 wherein said compound of a metal of Group IA or IIA is selected from the group consisting of lithium nitrate, lithium acetate, sodium carbonate, potassium nitrate, magnesium formate, calcium acetate and barium propionate.

13. The method of claim 10 in which the calcined composition of step (a) contains about 10 weight percent phosphorus and said calcined composition is impregnated with phosphoric acid and calcined and said calcined composition is impregnated with LiNO$_3$ and calcined to produce a Li/Sn/P/O catalyst containing about 12 weight percent phosphorus and about 2 weight percent lithium.

14. The method of claim 10 in which the calcined composition of step (a) is impregnated with said calcinable phosphorus-containing substance to increase the phosphorus content of said calcined composition by an amount within the range of from about 1 to about 3.5 weight percent.

15. The method of claim 10 in which said first calcined composition is a catalyst at least partially deactivated in the oxidative dehydrogenation of hydrocarbons.

16. A catalyst prepared in accordance with the method of claim 10.

17. A catalyst prepared in accordance with the method of claim 15.

18. A method of preparing a catalyst which comprises:
   (a) impregnating a calcined composition consisting essentially of tin, phosphorus and oxygen, said composition containing about 10 weight percent phosphorus, with phosphoric acid to increase the phosphorus content to a maximum of about 15 weight perecnt;
   (b) calcining the composition produced in step (a);
   (c) impregnating the calcined composition with lithium nitrate to produce a composition containing from about 0.1 to about 10 weight percent lithium based upon the total of the tin, phosphorus and oxygen of the calcined composition; and,
   (d) calcining the composition produced in step (c).

References Cited
UNITED STATES PATENTS

| | | | |
|---|---|---|---|
| 3,640,901 | 2/1972 | Walker | 252—437 |
| 3,555,105 | 1/1971 | Nolan et al. | 252—437 X |
| 3,501,548 | 3/1970 | Nolan et al. | 260—680 E |
| 2,518,354 | 8/1950 | Meinert et al. | 252—411 R |
| 2,575,457 | 11/1951 | Mavity | 252—435 |
| 3,274,283 | 9/1966 | Bethell | 252—437 X |
| 3,679,601 | 7/1972 | Nolan et al. | 252—437 |
| 3,320,329 | 5/1967 | Nolan | 252—437 X |

HELEN M. S. SNEED, Primary Examiner

U.S. Cl. X.R.

252—411 R; 260—668 D, 680 E